US006927517B2

(12) United States Patent
Brunet et al.

(10) Patent No.: US 6,927,517 B2
(45) Date of Patent: Aug. 9, 2005

(54) ROTARY MACHINE WITH AXIAL STOP INCORPORATING A CURRENT GENERATOR

(75) Inventors: Maurice Brunet, Sainte Colombe près Vernong (FR); Ulrich Schroeder, Mont Saint Aignan (FR); Yann Tremaudant, Poissy (FR)

(73) Assignee: Societe de Mecanique Magnetique, Saint Marcel (FR)

( * ) Notice: Subject to any disclaimer, the term of this patent is extended or adjusted under 35 U.S.C. 154(b) by 260 days.

(21) Appl. No.: 10/416,805

(22) PCT Filed: Nov. 16, 2001

(86) PCT No.: PCT/FR01/03598

§ 371 (c)(1),
(2), (4) Date: May 15, 2003

(87) PCT Pub. No.: WO02/40884

PCT Pub. Date: May 23, 2002

(65) Prior Publication Data

US 2004/0022653 A1 Feb. 5, 2004

(30) Foreign Application Priority Data

Nov. 17, 2000 (FR) .............................. 00 14846

(51) Int. Cl.[7] ........................... H02K 7/09; H02K 39/06
(52) U.S. Cl. ...................................... 310/90.5; 310/180
(58) Field of Search ........................ 310/90.5, 179–181, 310/184, 195, 198

(56) References Cited

U.S. PATENT DOCUMENTS

| 5,310,311 A | | 5/1994 | Andres et al. | |
|---|---|---|---|---|
| 5,525,848 A | | 6/1996 | Pinkerton et al. | |
| 5,572,079 A | | 11/1996 | Pinkerton | |
| 5,703,423 A | * | 12/1997 | Fukao et al. | ................ 310/90.5 |
| 6,262,506 B1 | * | 7/2001 | Shah et al. | ................ 310/90.5 |
| 2002/0011754 A1 | * | 1/2002 | Shinozaki | ................ 310/90.5 |

FOREIGN PATENT DOCUMENTS

JP          PJ-56126241      *  8/1981   ................ 310/90.5

* cited by examiner

Primary Examiner—Tran Nguyen
(74) Attorney, Agent, or Firm—McDermott Will & Emery LLP

(57) ABSTRACT

The rotary machine comprises a rotary shaft (2) supported by first and second radial magnetic bearings (5, 6) that are electrically controlled by a control device (13), said rotary shaft being fitted with an axial abutment device (100) comprising a rotor formed by a disk (101) secured to the rotary shaft (2) and interposed between first and second stators (102, 104) formed annularly around the rotary shaft and each including at least one annular coil (103; 105) controlled electrically by a system for servo-controlling the axial position of the rotary shaft. The stator (104) of the axial abutment device (100) further comprises a secondary induction circuit (106), and the disk (101) secured to the rotary shaft comprises a primary induction circuit (107) so that during rotation of the shaft, electricity is excited in the secondary induction circuit in order to supply energy to the radial magnetic bearings.

11 Claims, 5 Drawing Sheets

ROTARY MACHINE WITH AXIAL STOP INCORPORATING A CURRENT GENERATOR

The present invention relates to a rotary machine, for example a turbopump, comprising a rotary shaft supported by radial active magnetic bearings. More particularly, the invention relates to an emergency supply of electricity to radial and axial magnetic bearings, in particular for devices that are designed to operate in explosive atmospheres.

PRIOR ART

The use of rotary machines having magnetic bearings is becoming more and more widespread. The active magnetic bearings used in machines of this type use electromagnet devices which are operated by electricity and therefore require an electrical power supply.

FIG. 7 shows an example of a turboexpander. The machine comprises a rotary shaft 2 which is surrounded by two radial magnetic bearings 5 and 6 placed in the vicinity of the two ends of the shaft, together with a double-acting axial abutment. First and second wheels 3 and 4 are fixed to respective ends of the shaft 2. The first wheel 3 is situated on the left of the figure and receives a compressed fluid at an inlet port 11, which fluid drives the shaft in rotation. This portion of the compressor thus represents a turbine which, in operation, transmits rotary motion to the second wheel 4 for compressing a fluid flowing from an inlet port 10 an outlet port 9. While rotating, the shaft 2 is advantageously maintained in levitation by the two radial magnetic bearings 5 and 6 which are electrically controlled. The structure, the operation, and the advantages of active magnetic bearings as shown in the figure are well known.

Radial magnetic bearings are electrically controlled by a power supply device disposed in a control cabinet 40, which is itself mainly powered by an electric supply network 16. The centrifugal compressor further comprises passive auxiliary bearings 7 and 8 such as ball bearings or smooth rings which serve to receive the rotary shaft 2 in the event of a failure of the magnetic bearings. However, the rotary shaft is allowed to land on the auxiliary bearings only below a certain speed which is slow enough to avoid any risk of damaging or destroying the shafts and the bearings. For this purpose, the control cabinet 40, which is mainly powered by a supply network, also includes emergency batteries 42 intended to take over from the power network 16 powering the bearings in the event of a failure until speed has slowed down sufficiently to allow the shaft to cease being levitated and be received on the auxiliary bearings.

When the compressor is designed to operate in an explosive atmosphere 20, as shown in FIG. 7, the control cabinet 40 is situated at a distance from the machine in a non-explosive, protected zone 41. In that type of configuration, only the machine is placed in the explosive atmosphere zone 20, which is treated to be explosion-proof. The machine is connected to the remote cabinet via links 30 which are protected between the machine and the cabinet by leakproof sheaths 31.

For reasons of cost and equipment mobility, it is not always possible for control cabinets to be located remotely in protected environments. Under such circumstances, as shown in FIG. 8, an explosive-proof type control cabinet 40 can be situated close to the machine in the explosive atmosphere zone 20, but without having batteries inside it. Since it is not possible to totally deactivate batteries, which is essential for equipment in explosive zones, the batteries must be located outside the dangerous environment. Thus, the batteries 42 are always situated outside the zone 20. The connections between the control cabinet 40 and both the batteries 42 and the power supply network 16 are then provided by links 15 that are protected by leakproof sheaths 31 of the type used between the cabinet and the machine in FIG. 7. Consequently, such a configuration for the system comprising the system and its power supplies does not make it possible to have a system that is completely independent in explosive atmosphere zones.

Furthermore, since the lifetime of batteries is limited and since they are awkward to maintain, it is always advantageous to be able to avoid using batteries in machines of that type.

In order to remedy possible power cuts, which would cause control of the magnetic bearings to be lost, it is necessary to have some other protection within the machine itself, itself treated to be explosion-proof.

A solution that is known in the prior art relates to rotary machines that are electrically driven. With that type of machine, in the event of a power cut, the electric motor can act as a generator so as to ensure that the bearings are self-powered while the machine is slowing down to an acceptable speed at which contact is authorized between the shaft and the auxiliary bearings.

Nevertheless, that solution can be envisaged only for motor-driven rotary machines, whereas there are now many small turbomachines having magnetic bearings for which considerations of cost and bulk do not make it possible to include a conventional alternator which would alter the performance of such a machine of small dimensions.

OBJECT AND BRIEF DESCRIPTION OF THE INVENTION

The present invention seeks to remedy the above-mentioned drawbacks and to provide a rotary machine incorporating an emergency power supply that is compact, enabling its magnetic bearings to be controlled even when the machine does not have an internal electric motor.

These objects are achieved by a rotary machine comprising a rotary shaft supported by first and second radial magnetic bearings that are electrically controlled by a control device, said rotary shaft being fitted with an axial abutment device comprising a rotor formed by a disk secured to the rotary shaft and interposed between first and second stators formed annularly around the rotary shaft and each including at least one annular coil controlled electrically by a system for servo-controlling the axial position of the rotary shaft, characterized in that one of the two stators of the axial abutment device further comprises a secondary induction circuit, and in that the disk secured to the rotary shaft includes a primary induction circuit so that during rotation of the shaft, electricity is excited in the secondary induction circuit so as to deliver energy to the radial magnetic bearings.

Thus, without cluttering the structure of the machine, means for producing electricity are advantageously mounted in the axial abutment device which then becomes, in addition, an independent electricity generator for powering the magnetic bearings.

Preferably, the permanent magnets are disposed uniformly in the disk on a circle of diameter that is greater than, equal to, or less than the diameter of the secondary.

In an advantageous embodiment, the permanent magnets are disposed uniformly in the disk as a first series on a circle of diameter smaller than the diameter of the secondary and in a second series on a second circle of diameter greater than the diameter of the secondary, such that the gap defined between the first and second series of magnets forms a housing for receiving the secondary induction circuit.

The secondary induction circuit may comprise at least one toroidal winding wound on a core fixed to the stator of the axial abutment device.

In another embodiment, the secondary induction circuit comprises at least one plane winding on a printed circuit disposed on an annular structure fixed to the stator of the axial abutment device.

In which case, the plane winding is preferably disposed on the face of the annular structure which faces the nearer poles of the permanent magnets. The device for controlling the radial magnetic bearings is connected to the secondary induction circuit in order to receive the electricity generator therein.

The control device may be fixed on the machine, in which case it includes an explosion-proof covering.

BRIEF DESCRIPTION OF THE DRAWINGS

Other characteristics and advantages of the invention appear from the following description of particular embodiments of the invention given as non-limiting examples, and with reference to the accompanying drawings, in which.

DETAILED DESCRIPTION OF PARTICULAR EMBODIMENTS

Figure 1:
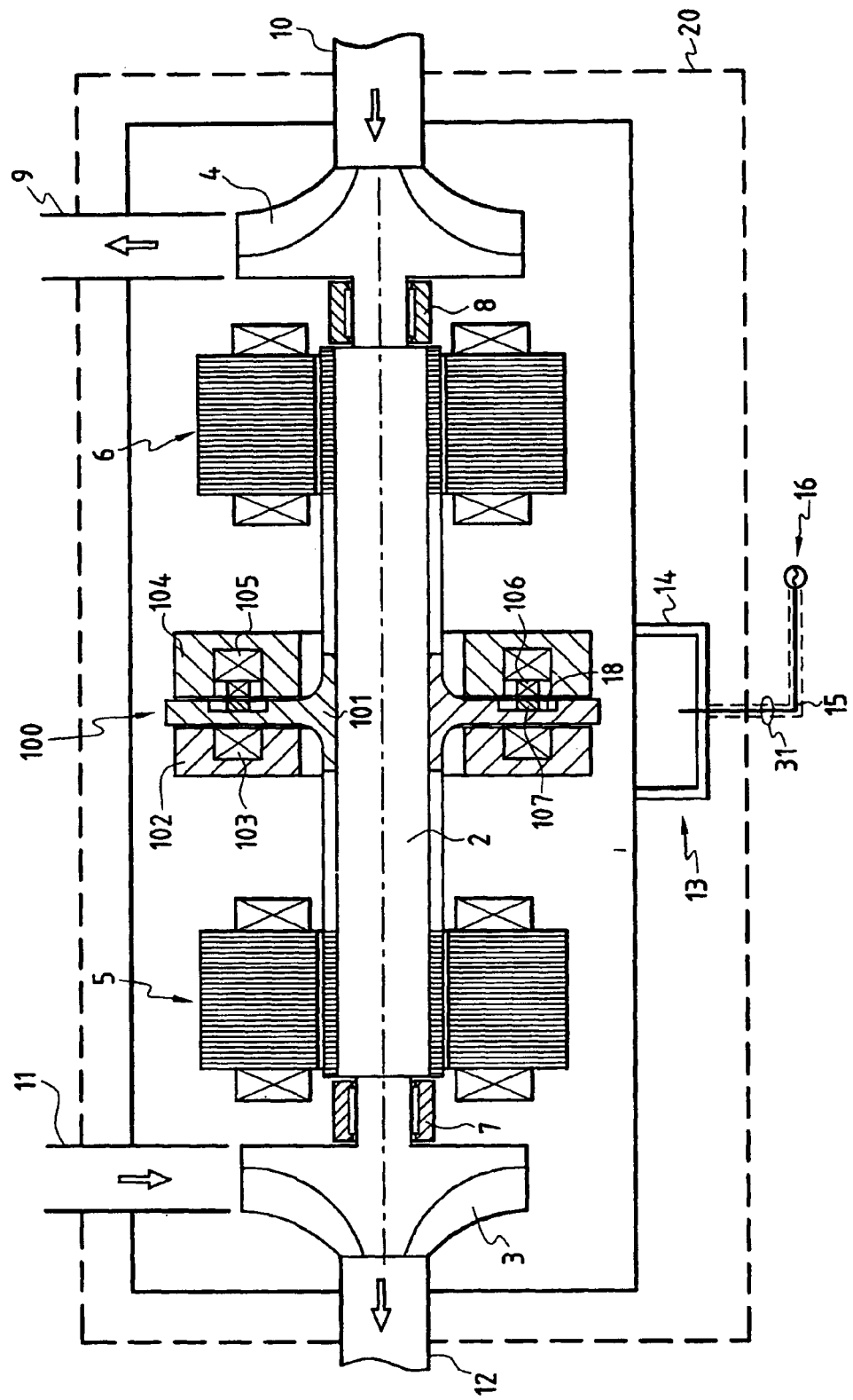
FIG. 1 is an axial section view of a centrifugal compressor showing, diagrammatically, an axial abutment device fitted with electricity generator means in accordance with the present invention.

FIG. 1 shows a turboexpander for operating in an explosive atmosphere zone 20 and including an axial abutment device 100 fitted with electricity generator means in accordance with the invention. The compressor mainly comprises a rotary shaft 2 supported by first and second radial active magnetic bearings 6 and 7 which are electrically controlled by a control device 13 situated in the zone 20, and preferably incorporated in the structure of the compressor. The control device 13 may be placed either in a box 14 that is treated to be explosion-proof if the machine is to operate in an explosive atmosphere zone 20, or else in a conventional junction box for use in environments that do not require special precautions.

The control device 13 is powered mainly from an electricity power supply network 16 with a connection point situated outside the zone 20. The device 13 is connected to the network 16 by a conductor 15 which has a leakproof sheath 31 to isolate the conductor 15 from the explosive atmosphere in the zone 20. The control device 13 then powers the radial bearings electrically, delivering current proportional to the levitation force needed by the rotary shaft 2. In known manner, the position of the shaft inside the radial bearings is continuously servo-controlled by measuring its radial displacement and by applying a correction by controlling the current fed to the bearings.

In the example described, the compressor does not incorporate an electric motor. The shaft is rotated by a flow of fluid under pressure admitted via a duct 11 and serving to drive a first wheel 3 prior to being exhausted through an outlet duct 12. The wheel 3 driven by the flow of the fluid under pressure acts as a turbine for driving the compressor. The shaft set into rotation in this way drives a second wheel 14 for pumping a working fluid that flows between an admission duct 10 and an outlet duct 9. This type of compressor thus operates by driving the turbine, which can be done from a supply of compressed gas or directly by the gas expansion that occurs during a process of separating the liquid phase and the vapor phase of the gas.

Rotary machines that are not driven by an electric motor may include other devices for driving the pump. By way of example, a turbine outside the machine may be located outside the explosive atmosphere zone while being connected to the pump via a flexible link.

First and second auxiliary bearings 7 and 8 are placed around each of the ends of the shaft 2. These passive bearings serve mainly to receive the shaft 2 in the event of the radial magnetic bearings failing. Nevertheless, in order to avoid possible damage, the shaft 2 should make contact with the auxiliary bearings only when its speed of rotation is below a certain speed. This authorized speed is of the order of 1000 revolutions per minute (rpm). It is therefore necessary to be able to conserve magnetic levitation of the shaft until its speed of rotation slows down to the authorized speed even in the event of the power supply from the network 16 failing. As mentioned above, prior art solutions do not make it possible to obtain an emergency device which simultaneously combines safety aspects and compactness aspects which are of very great importance for this type of rotary machine.

The invention thus proposes to take advantage of the magnetic axial abutment device which is very commonly used in rotary machines. The axial abutment device 100 comprises, in conventional manner, a rotor 101 in the form of a disk secured to the shaft 2 and interposed between two stator 102 and 104 each having one or more annular coils 103 and 105. The coils are electrically controlled by a conventional servo-control system which detects axial displacement of the shaft by means of a position sensor in order to respond by delivering electrical current that is proportional to the axial movement to be corrected. In the various embodiments of axial abutment devices fitted with generator means in accordance with the invention as described below, elements that are common from one abutment device to another are given references having the same tens and units digits.

In accordance with the invention, a primary induction circuit or "primary" 107 for producing a magnetic field is disposed in the disk 101, while in the vicinity thereof there is a secondary induction circuit or "secondary" 106 fixed on the stator 104 facing the disk. When the rotary shaft is in operation, the primary 107 rotates in the vicinity of the stationary secondary 106, thereby creating magnetic flux variation which excites an electrical current in the secondary. In FIG. 1, the primary is situated in a circular opening formed in the right-hand face of the disk, which means that it is the stator referenced 104 that needs to include the secondary 106. Nevertheless, the primary could equally well be situated on the left-hand side of the disk, in which case it would operate with a secondary included in the other stator 102.

Figure 2:
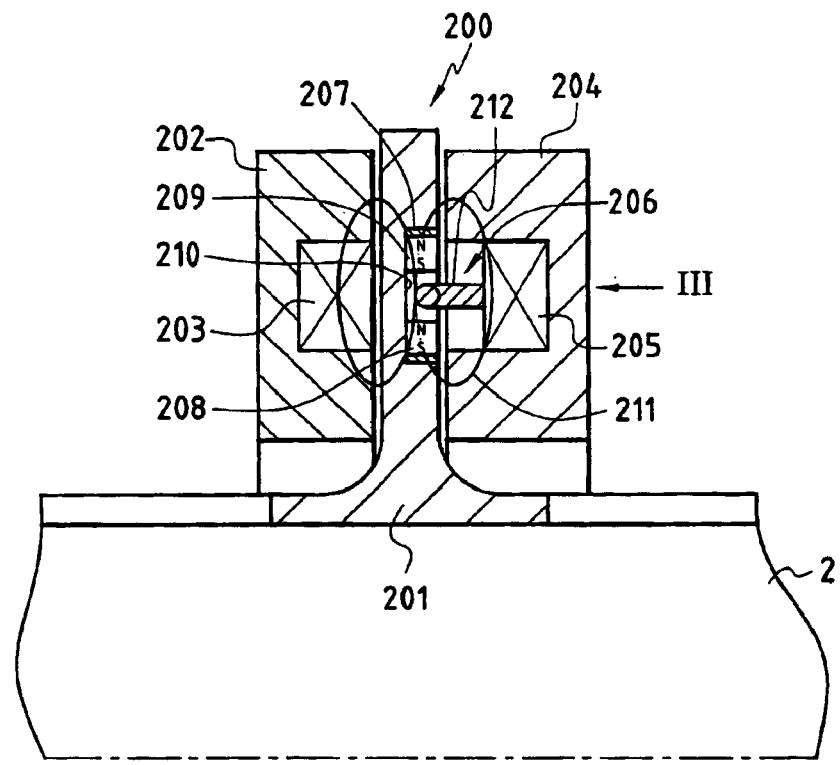
FIG. 2 is an axial half-section view of a first arrangement of electricity generator means in the axial abutment device in accordance with the present invention.
Figure 3:
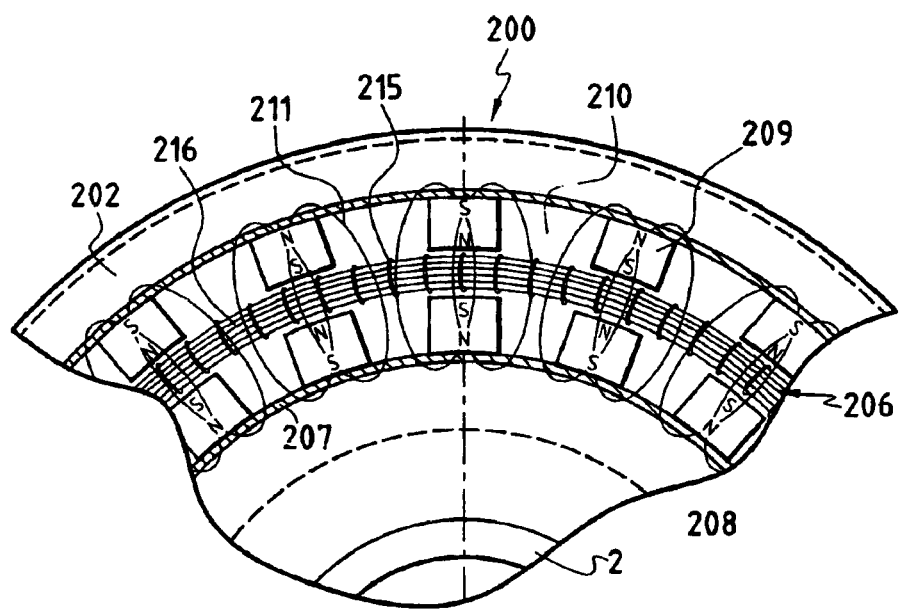
FIG. 3 is an axial section view on line III—III of FIG. 2, showing how the arrangement of fixed magnets on the rotor portion of the axial abutment device and a toroidal winding fixed on the stator portion of the abutment device in a first embodiment in accordance with the present invention.

FIGS. 2 and 3 show an embodiment of an axial abutment 200 fitted with electricity generator means of the invention. The disk 201 that is secured to the shaft has a first series of permanent magnets 208 and a second series of permanent magnets 209 disposed respectively in two circles of different diameters that are concentric about the axis of the disk 201. The magnets in each series are disposed in such a manner that two magnets, one from each of the first and second series, are in alignment and have their polarities oriented in a radial direction of the disk 201 so as to form pairs of poles creating a magnetic field as represented by lines 211 around each pair. The way the magnets are configured on the disk 201 can be the same as the possible arrangements known for flat motors, depending on the number of pairs of poles that are desired.

The magnets are embedded in the disk in such a manner as to be held positively by the disks against centrifugal forces.

The magnets do not modify the path followed by the magnetic field used for operation of the axial abutment. Non-magnetic pieces 207 and 208 may be interposed between the poles of adjacent magnets and the bulk of the disk.

The circular portion of the disk 201 situated between the two series of magnets is hollowed out to form a cavity 210 in which there is inserted a portion of the secondary 206. As shown in FIG. 3, the secondary 206 may be formed by a toroidal winding 215 whose turns are wound on an iron or ferrite core 216. In this configuration, the secondary 206 is fastened to the stator 204 by a plurality of fasteners 212 interposed between the core 216 and the stator 204. Alternatively, the winding may be made on a printed circuit which is fastened to an annular structure made of ferrous material. Whatever the winding structure used, the winding may be a two-phase or a three-phase winding and the primary may have an arbitrary number of poles.

Since the winding is the stator portion of the electricity generator means, electricity flows in the winding only if the disk is rotating and causing the pairs of poles to travel past the windings. Clearly, these electricity generator means must not significantly alter the electromagnetic characteristics of the axial abutment device in order to avoid interfering with its operation. That is why the invention proposes installing the permanent magnets in the rotor element of the abutment device in a portion facing one of the stator elements of the abutment device, with the stator element in question carrying the winding in which current flows only while the permanent magnets are moving.

In addition, since the magnets are installed circularly in the disk, they travel with significant peripheral speed, even at relatively low speeds of rotation of the shaft, thus enabling the magnetic bearings to be fed with sufficient electricity to maintain shaft levitation, even at low speed. In any event, the maximum speed of rotation at which contact is authorized between the shaft and the auxiliary bearings (which is about 1000 rpm) is sufficient for the electricity generator means of the abutment still to be capable of producing enough energy for powering the radial bearings. While starting up, as soon as a speed of rotation of several thousand revolutions per minute has been reached on the auxiliary bearings, the electricity generator means incorporated in the abutment device supply sufficient power to activate the magnetic bearings and self-levitate the rotary shaft which is then maintained in this condition of magnetic levitation so long as its speed remains sufficient, i.e. greater than about 1000 rpm.

The electricity generated in the winding of the secondary 206 is delivered to the control device 13 which includes an electronic circuit (not shown) in particular having a DC/DC converter with a large input range making it possible to power the control electronics of the active magnetic bearings 5, 6 at a constant voltage, even at low speed.

On the same operating principle as that described with reference to FIGS. 2 and 3, numerous variant arrangements can be envisaged, both for the secondary and for the primary, without losing the above-mentioned advantages.

Figure 4:
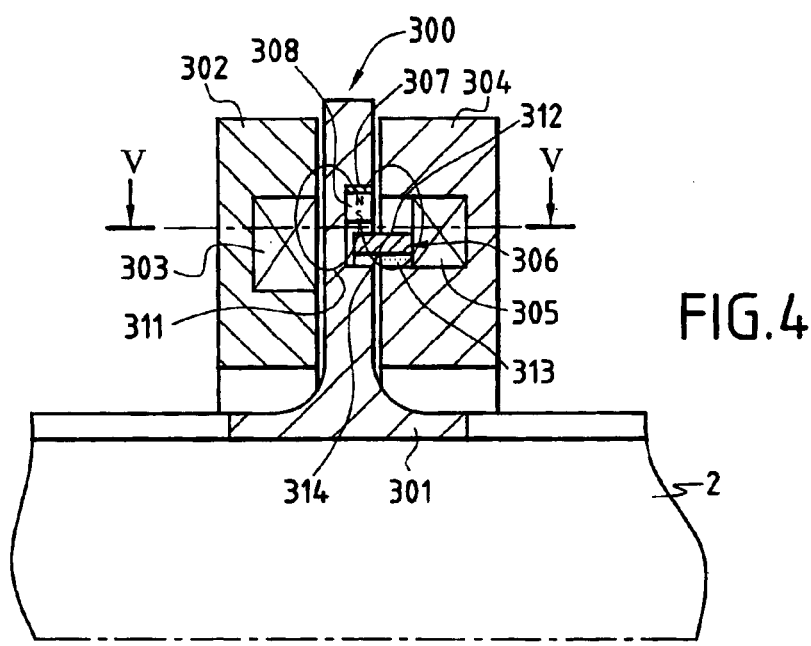
FIG. 4 is an axial half-section view of a second arrangement of electricity generator means in the axial abutment device in accordance with the present invention.
Figure 5:
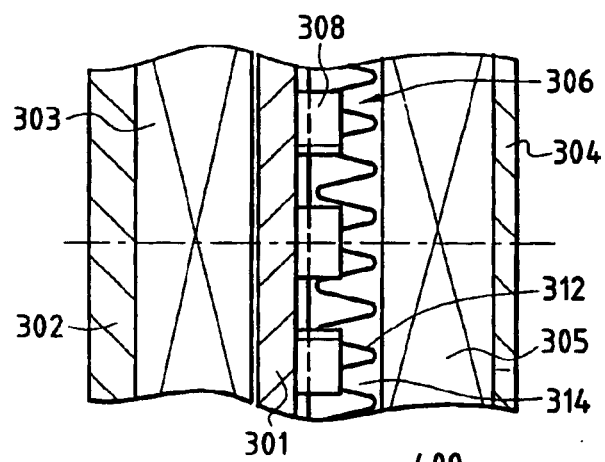
FIG. 5 is an axial section view on line V—V of FIG. 4 showing the relative disposition of magnets fixed to the rotor portion of the axial abutment device and a printed circuit winding on an outer peripheral portion of a ring fixed to a stator of the abutment device in a second embodiment in accordance with the present invention.

FIGS. 4 and 5 are views of one possible variant embodiment. In this example, the primary has a single series of permanent magnets 308 placed in the structure of a disk 301 belonging to an axial abutment device 300 of the same type as those described above in the present application. The secondary 306 may be constituted by a toroidal winding of the type described with reference to FIG. 3, or as shown in FIG. 5, it may be made up of an annular structure 314 having an outer peripheral surface which comprises a printed circuit 312 defining a plane winding. Alternatively, the winding may be disposed on the inner peripheral surface of the annular structure 314, providing the series of permanent magnets 308 is disposed on a circle of smaller diameter so that the magnets are situated inside the annular structure.

The annular structure is fixed in the vicinity of the annular winding 305 of the stator 304. In the configuration shown, the fixing of the annular structure may be reinforced by a non-ferrous material 313 interposed between the stator 304 and an inner peripheral portion of the annular structure.

Figure 6:
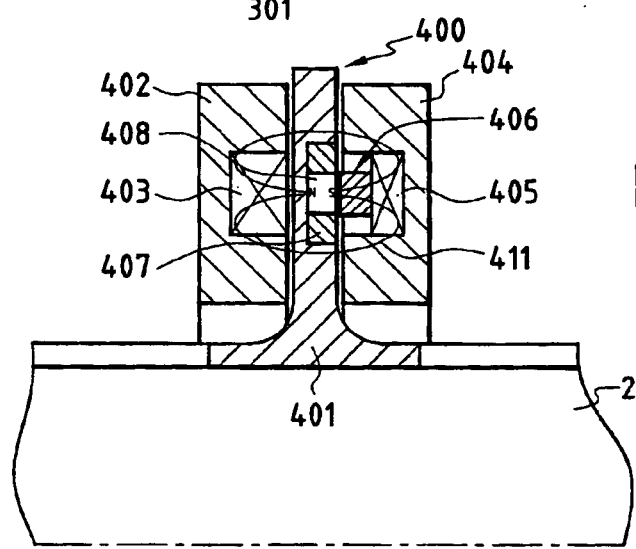
FIG. 6 is an axial half-section view of a third arrangement of electricity generator means in the axial abutment device in accordance with the present invention.
Figure 7:
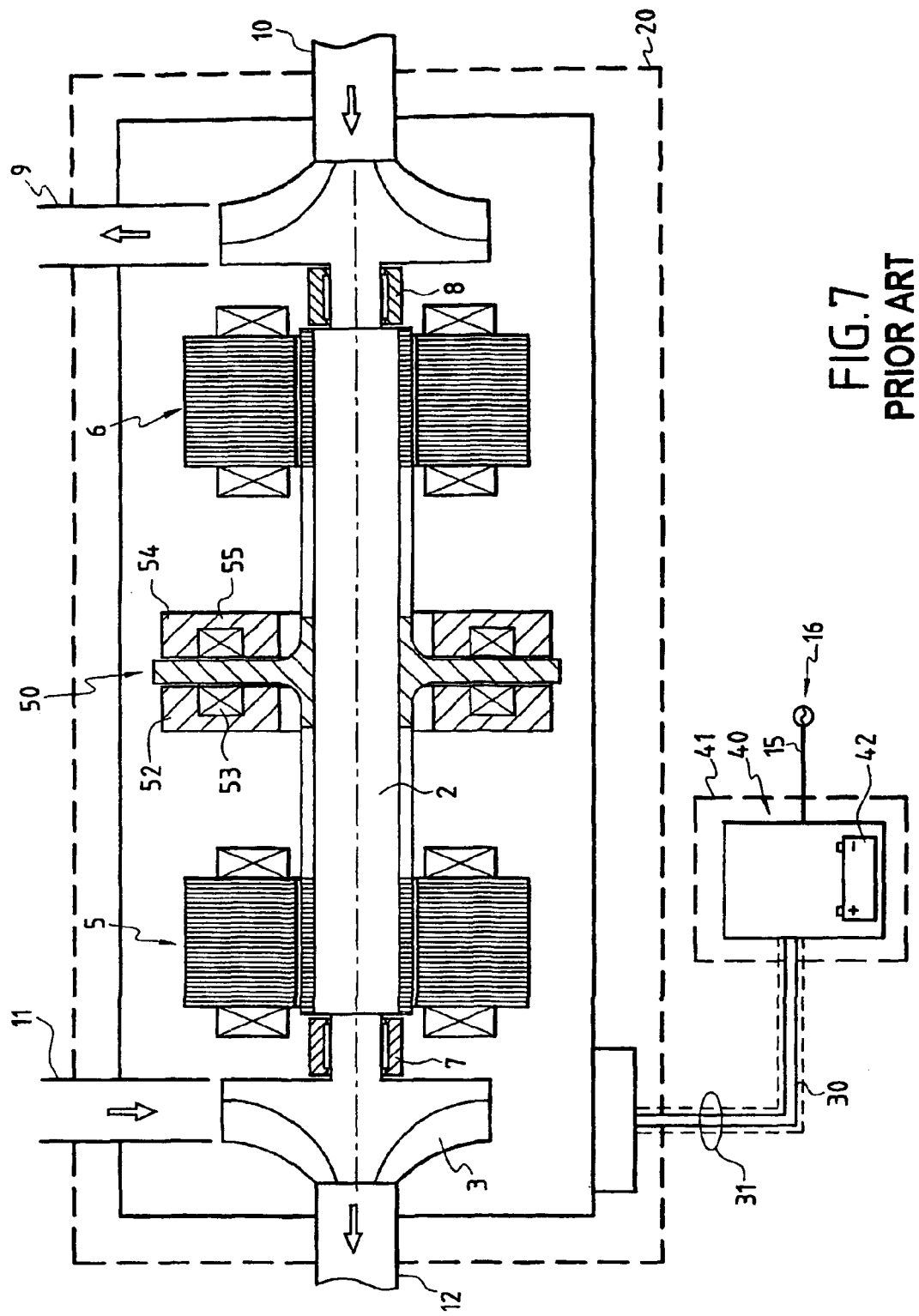
FIG. 7 is an axial section view of a centrifugal compressor and its control device in a first example of the prior art.
Figure 8:
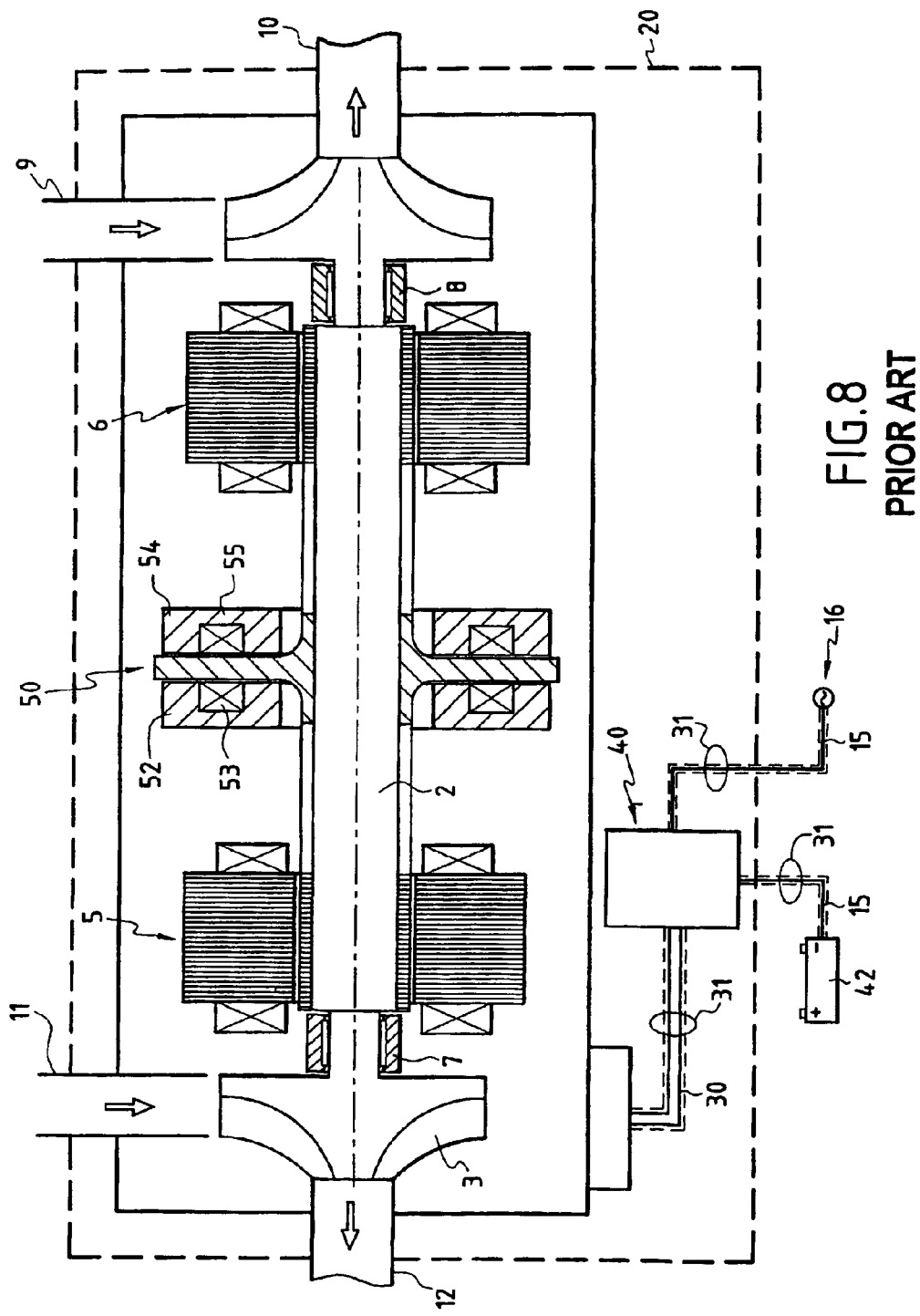
FIG. 8 is an axial section view of a centrifugal compressor and its control device in a second example of the prior art.

FIG. 6 shows another variant embodiment of the electricity generator means in the axial abutment device. In this figure, the abutment device 400 comprises a disk 401 including a series of permanent magnets 408 still disposed on a circle that is concentric about the axis of the disk 401. However, in this embodiment, the poles of the magnets are oriented differently from the orientation shown above. In this case the poles are oriented in a direction parallel to the axis of the disk, thereby creating a magnetic field having field lines 411 which extend in a plane perpendicular to the disk. Under such circumstances, the secondary 406 must also be oriented differently in order to generate electricity under the influence of the magnetic flux created by moving the magnets 408.

If the secondary 406 is constituted as a toroidal winding, then it should be wound around a core that has no iron and that is situated inside the stator 408 without projecting from the surface of the stator situated facing the disk 401. If the secondary 406 is constituted by a plane winding on a printed circuit, then the printed circuit should be placed directly on the face of the secondary 406 which is parallel to the facing surface of the disk 401.

The three embodiments described above constitute examples showing only some of the variants that could be made in the context of the invention. Other embodiments could also be envisaged without difficulty by the person skilled in the art.

In addition, the axial abutment device fitted with electricity generator means of the invention is described in association with a rotary machine that is not driven by an electric motor. Nevertheless, given the compactness of these means and the way in which the dynamic characteristics of the machine are preserved because the means are integrated in the abutment device, it is advantageous for such means to be mounted even in rotary machines that are driven by an electric motor, thus providing an emergency power supply for the bearings that is completely independent.

What is claimed is:

1. A rotary machine comprising a rotary shaft (2) supported by first and second radial magnetic bearings (5, 6) that are electrically controlled by a control device (13), said rotary shaft being fitted with an axial abutment device (100) comprising a rotor formed by a disk (101) secured to the rotary shaft (2) and interposed between first and second stators (102, 104) formed annularly around the rotary shaft and each including at least one annular coil (103; 105) controlled electrically by a system for servo-controlling the axial position of the rotary shaft, characterized in that one of the two stators of the axial abutment device (100) further comprises a secondary induction circuit (106), and in that the disk (101) secured to the rotary shaft includes a primary induction circuit (107) so that during rotation of the shaft, electricity is excited in the secondary induction circuit so as to deliver energy to the radial magnetic bearings.

2. A rotary machine according to claim 1, characterized in that the primary induction circuit comprises a plurality of permanent magnets (208, 209; 308; 408) fixed in the structure of the disk (101).

3. A rotary machine according to claim 2, characterized in that the permanent magnets (308; 408) are disposed uniformly in the disk on a circle of diameter that is greater than, equal to, or less than the diameter of the secondary induction circuit.

4. A rotary machine according to claim 2, characterized in that the permanent magnets (208, 209) are disposed uniformly in the disk as a first series on a circle of diameter smaller than the diameter of the secondary induction circuit (206) and in a second series on a second circle of diameter greater than the diameter of the secondary induction circuit, such that the gap defined between the first and second series of magnets forms a housing (210) for the secondary induction circuit.

5. A rotary machine according to any one of claims 1 to 4, characterized in that the secondary induction circuit (206) comprises at least one toroidal winding (215) wound on a core (216) fixed to the stator (204) of the axial abutment device (200).

6. A rotary machine according to any one of claims 1 to 4, characterized in that the secondary induction circuit (306) comprises at least one plane winding (312) on a printed circuit disposed on an annular structure (314) fixed to the stator (304) of the axial abutment device (300).

7. A rotary machine according to claim 6, characterized in that the plane winding (312) is disposed on the face of the annular structure (314) which faces the nearer poles of the permanent magnets.

8. A rotary machine according to any one of claims 1 to 7, characterized in that the device (13) for controlling the radial magnetic bearings is connected to the secondary induction circuit in order to receive the electricity generated therein.

9. A rotary machine according to any one of claims 1 to 8, characterized in that the control device (13) is fixed to the machine and includes an explosion-proof cover (14).

10. A rotary machine according to any one of claims 1 to 9, characterized in that it operates in an explosive atmosphere zone (20).

11. A rotary machine according to any one of claims 1 to 10, characterized in that it does not have an electric motor integrated therein.

* * * * *